Figure 1:
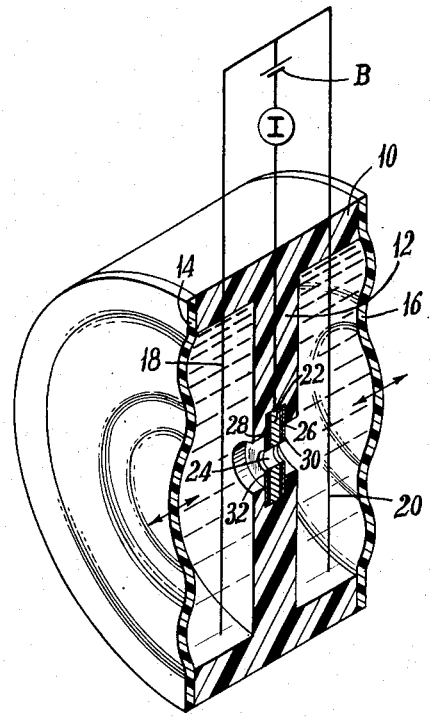

March 24, 1964     W. G. DARLAND, JR., ETAL     3,126,504
ELECTRODES FOR LOGARITHMIC DETECTOR UNITS
Filed July 13, 1959

INVENTORS
WILLIAM G. DARLAND, JR.
ROBERT A. POWERS
BY *John F. Hohmann*
ATTORNEY

United States Patent Office 3,126,504
Patented Mar. 24, 1964

3,126,504
ELECTRODES FOR LOGARITHMIC
DETECTOR UNITS
William G. Darland, Jr., Parma, and Robert A. Powers, Lakewood, Ohio, assignors to Union Carbide Corporation, a corporation of New York
Filed July 13, 1959, Ser. No. 826,567
5 Claims. (Cl. 317—231)

This invention relates to logarithmic detector units and has particular reference to improved electrodes for such units.

One member of a recently introduced family of devices generally referred to as "solions" is an electrochemical detector. The basic principles of such devices are described in a paper by Hurd and Lane "Principles of Very Low Power Electrochemical Control Devices," Journal of the Electrochemical Society, volume 104, #12, December, 1957. Detectors of the solion type convert signals such as acoustical pressure into electric current. They comprise generally a housing divided into two compartments, one wall of which compartment is a flexible diaphragm. The other wall is a common partition having an aperture in which is mounted a detecting electrode having an orifice for the transmission of liquid from one compartment to the other. Both compartments are filled with a liquid electrolyte containing a reversible redox system, and in each compartment is an electrode which is made the anode in a biasing circuit. When properly biased, a measured species of the redox system slowly diffuses to the detecting electrode where it undergoes electrochemical reaction. Now, if a signal such as an acoustical pressure is provided on the flexible diaphragm defining one wall of either compartment, the solution in that compartment tends to flow through the orifice, thereby making a greater quantity of the measured species available for electrochemical reaction at the detecting electrode. Thus, in response to a pressure, an electric current is produced and can be measured. The current observed at a fixed voltage increases with applied pressure and is a logarithmic function of the pressure input. Hence, the device is referred to as a "Log. Detector."

In devices of this type so far produced, the detecting electrode has usually been a cathode, but it may be an anode. For conciseness herein, the electrode will be referred to specifically as a "cathode." The most usual type of detecting cathode has been a disc of platinum having a tiny orifice therein. Since the effective part of the cathode is only the periphery or wall of the orifice, the faces of the disc in which the orifice is provided have been insulated by the application of a thin layer of glass thereto. Irregularities in operation of the devices have been encountered, and it is believed that such irregularities are attributable to the thin glass insulation which has a tendency to crack and become separated from the platinum. Further, impurities in the glass tend to be leached out by the electrolyte and deposited on the platinum, changing the geometry of the orifice. Whether or not these explanations are correct, the fact is that detecting electrodes heretofore used have not been entirely uniform in performance and have been difficult to manufacture. There is consequently a demand for an improved construction for such electrodes capable of simpler manufacture and more uniform performance.

It is the principal object of this invention to satisfy this demand.

Figure 2:
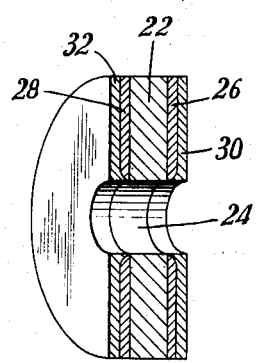

The invention will be described with reference to the drawing in which:

FIG. 1 is an isometric view, part being broken away, of a logarithmic detector unit provided with a detecting cathode embodying the invention; and FIG. 2 is a similar view greatly enlarged of the detector cathode provided in the device of FIG. 1.

The invention comprises an improved electrode for a solion device of the type described. The electrode of the invention is composed of tantalum-clad platinum and has an orifice therein. The exposed tantalum surfaces of the electrode, including those in the walls of the orifice, are insulated by a layer of tantalum oxide. The oxide layer is separated from the platinum except at the orifice by a layer of pure tantalum metal.

It is the essence of the invention that the detecting electrode be fabricated of tantalum-clad platinum. The term "clad" in this sense is used to denote a substantially non-porous layer of tantalum metallurgically bonded to the platinum so that to all intents and purposes the surface is tantalum. The technique of producing such a material is well known to the metallurgical art and is widely used to produce nickel-clad steel for instance. It is specifically pointed out that the provision of a deposit of tantalum by vapor-deposition methods onto a sheet of platinum or the deposition of platinum onto a sheet of tantalum by electroplating does not produce a tantalum-clad platinum electrode suitable for this invention, and materials so produced are not included within its scope.

Referring to the drawing, a solion log detector provided with a cathode embodying the invention comprises a housing 10 divided into two compartments by an apertured partition 12, each of the compartments having as one wall thereof one of a pair of flexible diaphragms 14, 16. In each compartment is one of a pair of electrodes 18, 20 connected to a biasing battery B and constituting anodes for each compartment. A cathode 22 having an orifice 24 at its center is positioned in the aperture of the partition 12. The cathode 22 is composed of platinum and, as best seen in FIG. 2, is coated on each side with a layer 26, 28 of tantalum. Tightly adherent to the tantalum layers 26, 28 is a coating 30, 32 of tantalum oxide. Both compartments of the device are filled with an electrolyte composed of an aqueous solution containing a reversible redox couple.

The electrode of the invention is quite simply made. For example, a platinum sheet having an average thickness of about 0.0008 inch clad with tantalum on each side is used, the tantalum layers each being about 0.0006 inch in thickness. An appropriately-sized disc, for example ¼ inch in diameter, may be cut from the sheet. The orifice about 0.01 inch in diameter, for example, may then be drilled centrally in the disc. To assure clean orifices free from burrs, it is desirable to stack a number of discs and drill through the entire stack while it is held under pressure.

The drilled disc is then cleaned by conventional solvent or vapor degreasing practice, washed with an alkaline detergent, and washed again in hot water. The disc is then etched, suitably in a mixture of nitric acid and hydrofluoric acid (40% nitric acid by volume) at room temperature. After etching, the disc is again washed in hot water. The disc is then made the anode between a pair of platinum cathodes in an acid electrolyte, suitably a 0.0025 normal solution of phosphoric acid to form the tantalum oxide coating in situ. A current of about 140 to 170 milliamperes is passed, at about 20 volts, and the voltage is raised slowly to about 115 to 125 volts. The total anodizing time under these conditions is about ten minutes.

Cathodes prepared in the manner described have proved to yield consistently uniform response over a variety of conditions when utilized in log detectors of the type illustrated in FIG. 1. In tests of such devices provided with such cathodes, the electrolyte was an aqueous solution of potassium iodide containing a reversible iodine-iodide redox system.

It will be apparent to those skilled in the art that the foregoing discussion is exemplary of the principles of the invention and that many variations may be made in these techniques without departing from the invention. For instance, although reference is made to the use of the cathode in solions employing the iodine-iodide system, it is equally satisfactory for use in solions utilizing other reversible redox systems, such as those described in the publication referred to above.

We claim:

1. An electrode for a logarithmic detector comprising a sheet of tantalum-clad platinum having an orifice therein and a coating of an oxide of tantalum on the tantalum surfaces of said sheet, the peripheral walls of said orifice being composed of platinum.

2. The method of preparing a detecting electrode for a logarithmic detector which comprises providing an orifice in a tantalum-clad platinum sheet and oxidizing the tantalum surfaces of said sheet including that portion thereof exposed in said orifice.

3. An electrode for a logarithmic detector comprising a sheet of platinum having a substantially nonporous layer of tantalum metallurgically bonded to the surfaces thereof and having an orifice therein, and a coating of an oxide of tantalum on the surfaces of said tantalum layer, the peripheral walls of said orifice being composed of platinum.

4. In a logarithmic detector having a housing divided into a pair of compartments, one wall of each of which has a flexible diaphragm therein, a partition between said compartments having an aperture therein, and an electrode and electrolyte of a reversible redox system in each of said compartments; the improvement which comprises a detecting electrode mounted in the aperture of said partition and comprising a sheet of tantalum-clad platinum having an orifice therein and a coating of an oxide of tantalum on the tantalum surfaces of said sheet, the peripheral walls of said orifice being composed of platinum.

5. In a logarithmic detector having a housing divided into a pair of compartments, one wall of each of which has a flexible diaphragm therein, a partition between said compartments having an aperture therein, and an electrode and electrolyte of a reversible redox system in each of said compartments; the improvement which comprises a detecting electrode mounted in the aperture of said partition and comprising a sheet of platinum having a substantially nonporous layer of tantalum metallurgically bonded to the surfaces thereof and having an orifice therein, and a coating of an oxide of tantalum on the surfaces of said tantalum layer, the peripheral walls of said orifice being composed of platinum.

References Cited in the file of this patent

UNITED STATES PATENTS

| | | |
|---|---|---|
| 1,758,947 | Hammond | May 20, 1930 |
| 2,075,351 | Lilienfeld | Mar. 30, 1937 |
| 2,088,949 | Fekete | Aug. 3, 1947 |
| 2,685,025 | Root | July 27, 1954 |
| 2,890,414 | Snavely | June 9, 1959 |
| 2,896,095 | Reed et al. | July 21, 1959 |
| 2,930,951 | Burger et al. | Mar. 29, 1960 |
| 2,955,999 | Tirrell | Oct. 11, 1960 |